Nov. 21. 1950 M. L. SANDS ET AL 2,531,164

PULSE AMPLIFIER

Filed March 19, 1945

INVENTORS.
William C. Elmore, Otto R. Frisch
and Matthew L. Sands
BY
Robert A. Lavender Patented Nov. 21, 1950 2,531,164

UNITED STATES PATENT OFFICE 2,531,164

PULSE AMPLIFIER

Matthew L. Sands, Oxford, Mass., Otto R. Frisch, Liverpool, England, and William C. Elmore, Swarthmore, Pa.; said Matthew L. Sands and William C. Elmore assignors to the United States of America as represented by the United States Atomic Energy Commission Application March 19, 1945, Serial No. 583,496

3 Claims. (Cl. 178—44)

This invention relates to amplifying systems and more particularly to amplifiers responding to transient impulses.

Transient impulses play an important part in measuring and recording apparatus used in connection with nuclear investigations where charged particles are detected through their secondary electrical effect. In the detecting apparatus use is made of vacuum tube amplifiers which respond to transient impulses obtained, for example, from ionization of a gaseous medium when traversed by charged nuclei.

An amplifier utilized for the purpose of magnifying and analyzing ionization pulses must have a very fast rise time, that is, the output potential of the amplifier has to follow faithfully, without distortion, the input potential corresponding to the collection of ions or electrons. After the input pulse reaches its maximum the output potential has to return to zero in the shortest possible time. These two demands are generally in conflict with each other. This is evident from the following considerations.

The conventional resistance-capacity coupling in the amplifier narrows these limits of ideal performance. If the time constant of the coupling circuit is short the pulse rise is curtailed and distorted, whereas if the time constant is long the return to zero signal operating level will be considerably delayed. The recovery period of the amplifier circuit therefor depends on the time constant of the coupling network. As an illustration of the time factors involved in nuclear amplifiers the following example may be considered. A charge may be collected in a time varying between $10^{-2}$ to $10^{-7}$ seconds on an electrode whereas the discharge time determined by the electrical constants of the circuit will be slow in comparison requiring in some cases as much as one second. Impulses arriving at a rate higher than the discharge time cause a shift in the zero signal operating point tending to alter the base line used as a reference point for measurement. In other words, each successive impulse appears as a step above the preceding impulse resulting in an echelon formation of output pulses. In this manner the response of the amplifier with respect to the base line or zero signal operating point is limited to impulses arriving after the recovery time, whereas impulses arriving during the recovery time will not be properly recorded.

The above undesirable characteristics can be overcome to a certain extent by a compromise in the design of the coupling circuit between amplifying stages. By reducing recovery time and depending solely on the resistance-capacity constants step pulses may be recorded at a sufficiently fast rate with accompanying marked distortion in the wave form. However, when it is important to analyze the shape and the characteristics of individual pulses, while recording the maximum number of pulses per unit time, amplifiers heretofore used are inadequate. The reason for this, as outlined above, is that step pulses arriving within the recovery time will alter the base line whereas if the recovery time is made less than the time interval between pulses the pulse shape suffers serious distortion.

The primary object of the present invention is to extend the operating response of pulse amplifiers within the recovery time period while maintaining a fast rise time and thereby substantially eliminate the distortion of the output pulse.

Another object of the invention is to record step pulses at a rate faster than the recovery time of the amplifier input circuit while maintaining the base line of the output pulses at substantially zero signal operating level.

A particular advantage of the invention is that effective control of the duration and termination of the output pulse is independent from the electrical constants of the input circuit of the amplifier.

Another advantage of the invention is that step pulses may be amplified with an extremely fast rise time as well as at a fast rate per unit time whereby a qualitative analysis of the pulse shape may be made for a series of successive pulses.

The invention in its broader aspects comprises an amplifier having an input circuit of relatively large time constant which may be subjected to a step pulse at a rate faster than the recovery time of the input circuit and an output circuit in which circuit means obliterate the output pulse within a predetermined time and terminate the pulse in the form of a square pulse.

Other objects and advantages will be apparent from the following description of the invention, defined in particularity in the appended claims, and taken in connection with the accompanying drawing, in which:

Figures 3, 4, 5, and 6 illustrate by a series of curves the operating characteristics of the amplifier at various points in the circuit.

Figures 1, 3, 4, 5, 6:
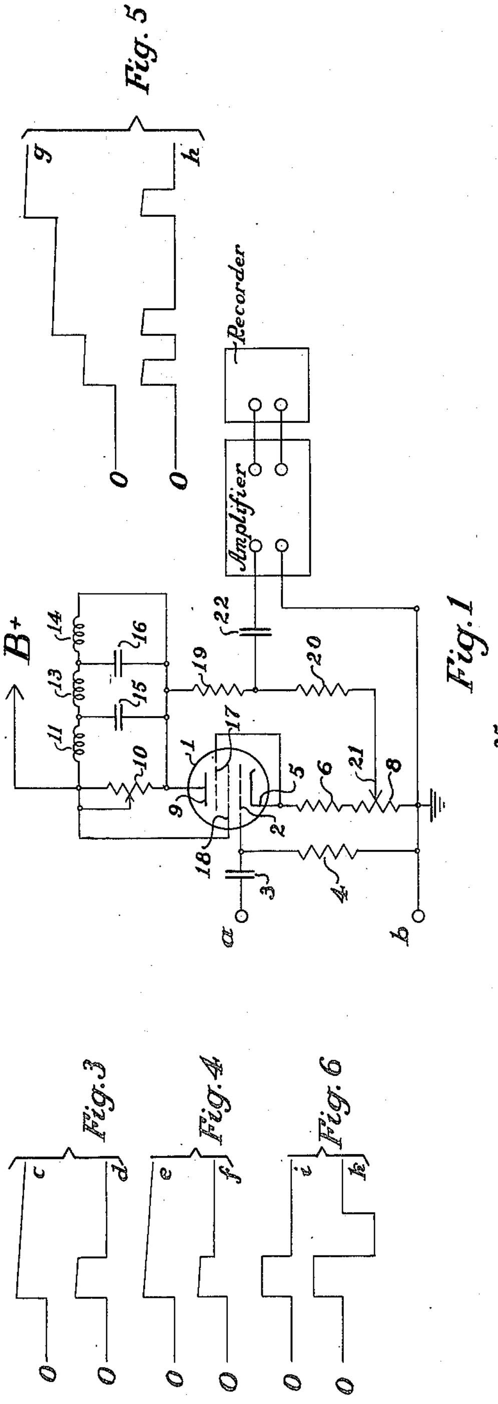
Figure 1 is a schematic circuit of an amplifying stage incorporating the features of the invention.

Referring to Figure 1, the amplifier stage includes the vacuum tube 1 of which the control electrode 2 connects to the input circuit between terminals *a* and *b*. The coupling to the control electrode 2 is effected by the capacity 3 and the return to ground potential by the resistor 4. The cathode 5 connects to the ground potential side of the system by means of the resistor 6 and the potentiometer 8 in series. The anode 9 connects to the output circuit of the amplifier which comprises a variable resistor 10 shunted by an artificial line including inductances 11, 13, and 14 and capacitors 15 and 16. The line represented here by the lumped constants is short-circuited at its output end. In other words, it is a closed end line. The termination of the line is at its open end by the resistor 10 which is adjustable to a value required for correct termination in the characteristic impedance of the line to avoid multiple reflection. The purpose of the line and its operation will be described later in greater detail.

The vacuum tube shown here is a pentode and the auxiliary electrodes return to the normally required potential terminals. The suppressor grid 17 returns to the cathode 5, and the screen grid 18 to the operating potential side of the circuit marked "B+".

A feedback circuit is provided between a portion of the cathode return circuit and the anode and includes the resistors 19 and 20 in series. The latter connects to the rider 21 of the potentiometer 8. The output of the amplifier is taken from the junction point of resistors 19 and 20 and the coupling is effected by the condenser 22. Further amplification of the output may be obtained by means of conventional vacuum tube amplifying stages shown here by a block diagram marked "Amplifier." The output of the latter is connected to a utilization device of any suitable type shown here by a block diagram marked "Recorder." This may be a pulse counting apparatus or a pulse analyzing device such as a cathode ray oscilloscope.

Figure 2:
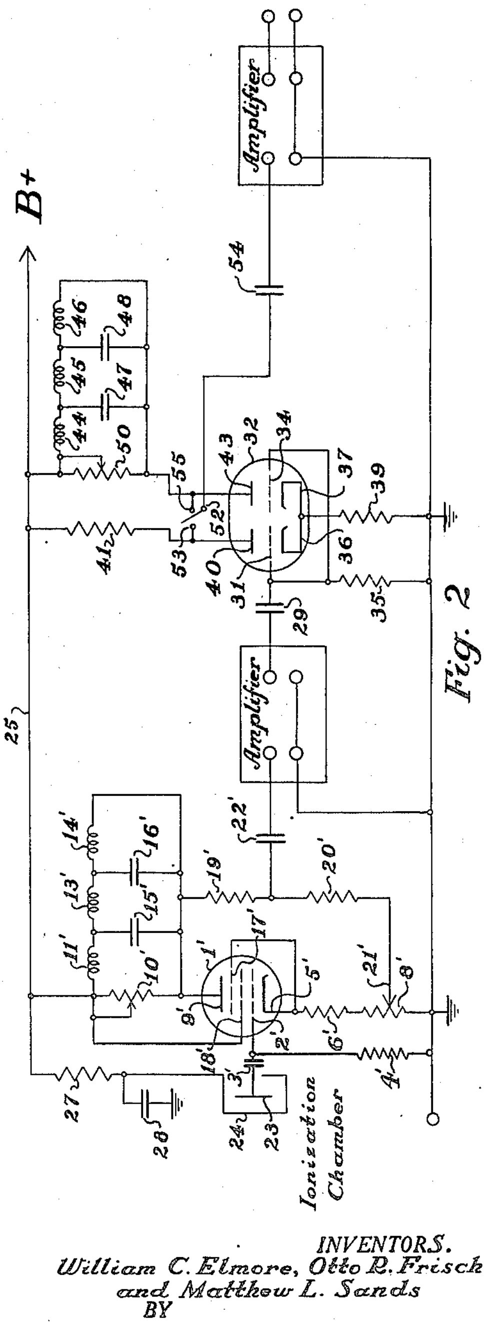
Figure 2 is a schematic circuit diagram of an amplifying system in which two amplifying stages operate in accordance with the invention to obtain a desired overall performance.

In the schematic circuits of the amplifying stages in Figures 1 and 2 the operating voltage supply for the various electrodes of the vacuum tubes as well as the heater circuit for the cathode, have been omitted in order to simplify the illustration. It is well known in the art that the cathodes of the tubes will be heated to emission temperature from a suitable source of filament current which may be either alternating or direct. The required direct current supply for the anode electrode may also be obtained from batteries or from rectified A. C. power supplies.

Prior to describing the operation of the amplifying stage of Figure 1 the circuit of the amplifying system shown in Figure 2 will be described in detail. In this figure an amplifying system is shown which includes two amplifying stages incorporating the features of the invention. The amplifying system is connected to an ionization chamber schematically illustrated as a source of transient pulses.

The input stage is identical insofar as circuit components are concerned with the amplifier shown in Figure 1. Consequently, in order to facilitate the understanding of the circuit identical circuit elements are marked by similar reference characters bearing primary indices.

The control electrode 2′ of the vacuum tube 1′ is coupled through condenser 3′ to the collector or inner 23 of the ionization chamber. The body or outer electrode 24 of the chamber is maintained at a positive potential with respect to ground and connects to the high voltage supply line 25 in series with the resistor 27 which is bypassed by the condenser 28. The output of the amplifier stage may feed into a standard amplifying circuit if further amplification is desired as shown here by the block diagram marked "Amplifier." The ouput of the latter is fed to the second amplifying stage of similar characteristics as the first or input stage. The coupling is effected by means of the condenser 29 which connects to the grid 31 of the first triode section of the duo-triode tube 32. The grid 34 of the second triode section returns to the grid 31 of the first triode. The common input circuit of the two triodes is returned to ground through the grid resistor 35. The cathodes 36 and 37 are inter connected and return to ground through the conventional bias resistor 39. The anode 40 of the first triode has a simple resistance load comprising the resistor 41. The anode 43 of the second triode has in its output circuit an artificial line comprising inductances 44, 45, and 46 and capacitors 47 and 48. The output end of the line is short-circuited whereas the input end is terminated in the adjustable resistor 50 in the same manner as described in connection with the amplifier shown in Figure 1. By virtue of the common input circuit the two triodes are simultaneously energized and the output of either one may be selected by the switch 52. When contact is made with the contactor 53 the output of the first triode is selected to be applied through the coupling condenser 54 to the succeeding output amplifier shown here in block diagram. Whereas, engaging the contactor 55 the output of the second triode is taken for further amplification in the succeeding output amplifier.

The operation of the amplifying stage in accordance with the invention can best be understood when considering Figure 1 in connection with the curves of Figures 3, 4, and 5. In Figure 3 the curve *c* indicates the shape of the input step pulse between terminals *a* and *b*. It is seen that this pulse rises at a very fast rate from zero to a certain value, and will return to zero value only after the comparatively long recovery time of the input circuit. In other words, the return slope depends entirely on the characteristics of the input circuit. If the input circuit has a short time constant the return slope will be short. However, in this case, as stated before, the output pulse will not follow the rapid rise of the input pulse. On the other hand, if the input circuit has a long time constant, the rise time, that is, the steepness of the pulse, will remain undistorted but the output pulse will not return to the zero input signal level in sufficient time before the arrival of the next input pulse. Customary resistance-capacity coupling offers only a compromise between the demands of undistorted output and a maximum desired number of input pulses per unit time. If the amplifier is called upon solely to produce output pulses without regard to wave form a satisfactory proportion can be made in the resistance-capacity coupling. In the latter case, if the pulse size and shape is also to be analyzed with accuracy the average spacing between pulses must be less than the recovery time of the input circuit. This is the undesirable condition which the present invention endeavors to remedy.

In the amplifying stage of Figure 1 the termination of the output pulse is independent from the input circuit which permits the design of this circuit with sufficiently slow recovery time to follow faithfully the rise of the input pulse. In the output circuit each pulse is terminated by means of reflection from the artificial line. The latter when properly terminated reflects a pulse in inverted phase to the input pulse. The characteristics of artificial or delay lines are known in the art and it becomes clear that if a line is terminated at its input end in its characteristic impedance and short-circuited at the output end a single reflection will occur after a predetermined delay depending upon the electrical length of the line. The line as shown is inserted in the anode circuit of the tube 1 and a signal appearing across the input circuit will be reflected back in inverted phase at twice the delay time of the line. The resultant output pulse is seen in curve *d* of Figure 3. The width of the pulse is determined by the delay time of the artificial line and the termination of the pulse to the zero signal base line is due to the fact that the reflected signal is in opposite phase.

In Figure 3, it is seen that curve *d* is a square pulse which is terminated prior to the recovery time of the input circuit. In this manner the response of the amplifying stage is extended within the recovery time of the input circuit and input pulses arriving during this time will be recorded in the output circuit at substantially the same zero signal level.

If the delay line introduces appreciable losses the reflected signal will be of an amplitude less than the amplified form of the original signal, and the pulse will not return to the zero signal reference level. This condition is illustrated in Figure 4, in which curve *e* represents the input pulse the same as curve *c* in Figure 3, and curve *f* the output pulse. The feedback circuit comprising resistors 19 and 20 aids the operation of the delay line in that a portion of the voltage appearing in the cathode circuit in phase with the reflected signal is fed back and completes the incomplete reflected pulse image. By proper adjustment of the slider 21 of the potentiometer 8 the losses in the delay line may be compensated and the output pulse terminated as shown in curve *d* of Figure 3 at a uniform zero signal reference level. Input pulses arriving within the recovery time of the input circuit are shown in curve *g* of Figure 5 illustrating the step formation as each successive input pulse raises the potential of the control electrode. In the output circuit by virtue of the termination effected by the artificial line each input pulse is terminated in a substantially square pulse as shown in curve *h* of Figure 5. From this it will be seen that the amplifier is responsive to input pulses arriving during the recovery period of the circuit and no distortion is introduced in the shape of each pulse. The output pulses may be further amplified in order to actuate a suitable recording instrument or for energizing an oscilloscope for visual representation of the input pulses.

The amplifying system in Figure 2 combines the functions of two amplifying stages in which the pulses are terminated at the output by means of artificial lines. The square pulses derived from the output of the first stage may be selected by means of the switch 52 to be further amplified as in Figure 1; or the square pulses may be converted into double square pulses having an alternating character when the output of the second triode section is utilized for succeeding operation. The action of the circuit is shown by the curves of Figure 6 in which curve *i* is the output pulse derived from the first stage in the form of a square pulse at the input circuit of the tube 32 and curve *k* the output pulse derived from the anode circuit of the second triode section, that is, from the anode 43 when the switch 52 makes contact with contactor 55. The artificial line inserted in the anode circuit reflects an image of the output pulse in inverted phase. Inasmuch as the output pulse here is a square pulse the image is also a square pulse and being in opposite phase the two pulses form a double square pulse as shown in curve *k* of Figure 6. In certain applications it is advantageous to form a pulse of this character in order to select either the original or only the inverted image for actuation of measuring or counting devices. The double square pulse is particularly advantageous when spurious impulses of long duration such as microphonics are to be suppressed.

We claim:

1. In an amplifier responsive to transient impulses, a vacuum tube having anode, cathode, and control electrodes, an input circuit having a characteristic time constant for return to static operating condition after receipt of an input pulse connected between said cathode and said control electrode adapted to receive step pulses at a rate faster than the recovery time of said circuit, determined by its electrical constants, an output circuit between said anode and cathode electrodes including an impedance common to said input and output circuits, means in said output circuit for completing a step pulse within a predetermined time interval comprising a closed end artificial line generating an image of said pulse in reversed phase and circuit means including a resistance substantially equal to the characteristic impedance shunting the open end of said line for applying said image to said output circuit whereby the resultant of said step pulse and said image pulse form a square pulse, means for compensating losses occurring in said line and tending to complete said image pulse above the static operating output level comprising an inverse feedback circuit between said common impedance and said anode circuit, said line being of such electrical length that the time delay in the application of said image pulse is substantially less than the time interval between application of said input pulses.

2. In an amplifier responsive to transient impulses, a vacuum tube having at least anode, cathode and control electrodes, an input circuit having a characteristic time constant for return to static operating condition after receipt of an input pulse connected between said cathode and said electrode and adapted to receive step pulses at a rate faster than the said time constant, an output circuit between said anode and cathode electrodes including an impedance common to said input and output circuits, means in said output circuit for completing a step pulse within a predetermined time interval comprising a closed end artificial line generating an image of said pulse in reversed phase and circuit means for applying said image to said output circuit whereby the resultant of said step pulse and said image pulse form a square pulse, means for compensating losses occurring in said line and tending to complete said image pulse above the static operating level of said output circuit comprising an inverse feedback circuit between said first mentioned impedance and said anode circuit, said artificial line being of such electrical length that the time delay in the application of said image pulse is substantially less than the time interval between application of said input pulses.

3. In an amplifier responsive to transient impulses, a vacuum tube having anode, cathode, and control electrodes, a resistance capacitance input circuit between said cathode and said control electrode adapted to receive pulses at a rate faster than the recovery time of said circuit as determined by the values of resistance and capacitance therein, an output circuit between said anode and cathode electrodes including an impedance common to said input and output circuits, means in said output circuit for completing a step pulse within a predetermined time interval comprising a closed end artificial line generating an image of said pulse in reversed phase and circuit means including a resistance substantially equal to the characteristic impedance shunting the open end of said line for applying said image to said output circuit whereby the resultant of said step pulse and said image pulse form a square pulse, means for compensating losses occurring in said line and tending to complete said image pulse above static operating output level comprising an inverse feedback circuit between said common impedance and said anode circuit, said line being of such electrical length that the time delay in the application of said image pulse is substantially less than the time interval between application of said input pulses.

MATTHEW L. SANDS.
OTTO R. FRISCH.
WILLIAM C. ELMORE.

REFERENCES CITED

The following references are of record in the file of this patent:

UNITED STATES PATENTS

| Number | Name | Date |
|---|---|---|
| 2,217,957 | Lewis | Oct. 15, 1940 |
| 2,266,154 | Blumlein | Dec. 16, 1941 |
| 2,433,379 | Levy | Dec. 30, 1947 |
| 2,436,662 | Norgaard | Feb. 24, 1948 |